United States Patent
Balannik et al.

(10) Patent No.: US 9,832,317 B2
(45) Date of Patent: Nov. 28, 2017

(54) METHODS AND APPARATUS TO OBTAIN VOICE MESSAGES

(75) Inventors: Vadim Balannik, Arlington Heights, IL (US); Patrick Dell Ellis, Lake in the Hills, IL (US)

(73) Assignee: BlackBerry Limited, Waterloo, Ontario (CA)

( * ) Notice: Subject to any disclaimer, the term of this patent is extended or adjusted under 35 U.S.C. 154(b) by 157 days.

(21) Appl. No.: 13/224,018

(22) Filed: Sep. 1, 2011

(65) Prior Publication Data
US 2013/0059569 A1    Mar. 7, 2013

(51) Int. Cl.
*H04M 1/725* (2006.01)
*H04M 3/533* (2006.01)

(52) U.S. Cl.
CPC .... *H04M 3/53333* (2013.01); *H04M 3/53325* (2013.01); *H04M 2203/2016* (2013.01); *H04M 2203/253* (2013.01); *H04M 2207/18* (2013.01)

(58) Field of Classification Search
CPC ......... H04M 3/53333; H04M 3/53325; H04M 2203/2016; H04M 2203/253; H04M 2207/18
USPC .... 455/413–414.1, 412.1–412.2, 551, 550.1, 455/566; 709/219; 379/100.08, 100.11, 379/100.16, 88.11, 88.12
See application file for complete search history.

(56) References Cited

U.S. PATENT DOCUMENTS

2008/0247520 A1* 10/2008 Scott .......................... 379/88.17
2010/0150324 A1*  6/2010 Albert et al. .............. 379/88.22
2010/0158214 A1    6/2010 Gravino et al.
2010/0159886 A1*  6/2010 Sigmund et al. .......... 455/412.2
2010/0159891 A1*  6/2010 Sigmund et al. ............. 455/413
2011/0081006 A1    4/2011 Hao et al.
2011/0143721 A1*  6/2011 Raphael et al. .............. 455/413
2011/0143722 A1*  6/2011 Shaw et al. .................. 455/413
2011/0143724 A1    6/2011 Zubas et al.

OTHER PUBLICATIONS

Iphone, Screen Shot of Visual Voicemail menu, generated on Aug. 2, 2011, 1 page.
Samsung Alias 2 Manual, Visual Voice Mail, 2009, 3 pages including p. 78.
Android Forums, Support Voicemail icon on homescreen, www.androidforums.com, retrieved from the Internet on Aug. 2, 2011, 3 pages.
Android Forums, Voice Mail app shortcut, www.androidforums.com, retrieved from the Internet on Aug. 2, 2011, 4 pages.
Dan Gookin, How to Use Visual Voice Mail on Your Droid X, www.dummies.com, retrieved from the Internet on Aug. 2, 2011, 3 pages.
European Patent Office, Extended European Search Report issued in EP patent application 11179890.6, dated Dec. 19, 2011, 6 pages.

* cited by examiner

*Primary Examiner* — Keith Fang
(74) *Attorney, Agent, or Firm* — Donna Flores; Fleit Gibbons Gutman Bongini & Bianco P.L.

(57) ABSTRACT

Methods and apparatus to obtain voice messages are disclosed. One example method includes receiving at a mobile device an indication to access voicemail, determining if visual voicemail is available, and initiating a call to a voicemail system in response to determining that visual voicemail is unavailable.

18 Claims, 4 Drawing Sheets

METHODS AND APPARATUS TO OBTAIN VOICE MESSAGES

FIELD OF THE DISCLOSURE

The present disclosure relates generally to communications and, more particularly, to methods and apparatus to obtain voice messages.

BACKGROUND

Voice messages, such as voicemail messages, are typically left for a call recipient when the recipient does not answer his or her telephone. In such situations, voicemail messages are left by a caller more or less in real time with placing a call to the call recipient. Sometime later, the call recipient may contact a voicemail server to retrieve voicemail messages.

DETAILED DESCRIPTION

Figure 1:
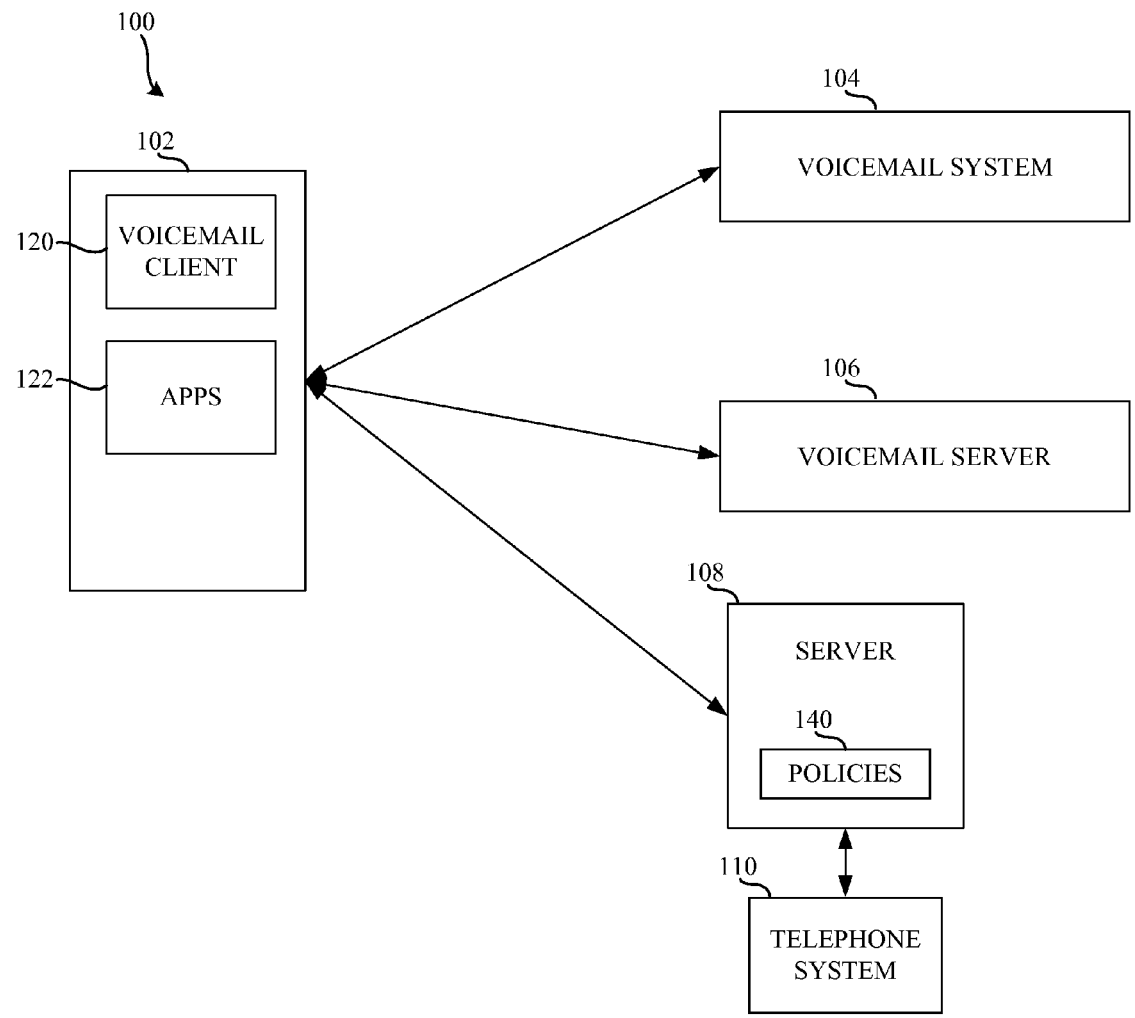
FIG. 1 depicts an example system for obtaining voice messages at a mobile device from either a voicemail server or a voicemail system.

Although the following discloses example methods, apparatus, and articles of manufacture including, among other components, software executed on hardware, it should be noted that such methods, apparatus, and articles of manufacture are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods, apparatus, and articles of manufacture, persons having ordinary skill in the art will readily appreciate that the examples provided are not the only way to implement such methods, apparatus, and articles of manufacture.

For simplicity and clarity of illustration, where considered appropriate, reference numerals may be repeated among the figures to indicate corresponding or analogous elements. In addition, numerous specific details are set forth in order to provide a thorough understanding of examples disclosed herein. However, those of ordinary skill in the art will understand that the examples disclosed herein may be practiced without these specific details. In other instances, well-known methods, procedures, and components have not been described in detail so as not to obscure examples disclosed herein. Also, the description is not to be considered as limiting the scope of examples disclosed herein.

Example methods, apparatus, and articles of manufacture disclosed herein may be used in connection with telephony-capable mobile devices, which may be any mobile communication device, mobile computing device, or any other element, entity, device, or service capable of communicating wirelessly. Mobile devices, also referred to as terminals, wireless terminals, mobile stations, communication stations, user equipment (UE), or user devices, may include mobile smart phones, cellular telephones, wireless personal digital assistants (PDA), tablet/laptop/notebook/netbook computers with wireless adapters, etc.

Example methods, apparatus, and articles of manufacture disclosed herein facilitate operations in a mobile device to obtain voice messages. In one example, a method includes receiving at a mobile device an indication to access voicemail, determining if visual voicemail is available, and initiating a call to a voicemail system in response to determining that visual voicemail is unavailable.

In one example, the indication may be keypress, which may last for at least a specified duration. Alternatively or additionally, the indication may be a series of keypresses.

In some examples, determining if visual voicemail is available may include determining if visual voicemail is installed, determining if visual voicemail is supported on a line selected on the mobile device, determining if visual voicemail is defined on the mobile device, determining if visual voicemail is activated on the mobile device, determining compliance with a policy on a server associated with the mobile device, or determining if visual voicemail is blocked on the mobile device. In some examples, determining if visual voicemail is defined is based on the mobile subscriber international subscriber directory number (MS ISDN) of the mobile device.

As shown in the example of FIG. 1, a mobile device 102 may retrieve voicemail messages from either a voicemail system 104 or a voicemail server 106. The mobile device 102 is also in communication with a server 108, such as an enterprise server that is in further communication with a telephone system 110. As described in further detail below, the mobile device 102 may first determine if visual voicemail is available and, if visual voicemail is unavailable, the mobile device 102 may seek voicemail access from the voicemail system 104.

In the example of FIG. 1, the mobile device 102 includes, among other things, a voicemail client 120 and applications 122. In practice, the mobile device 102 may be implemented by a mobile telephone, a smartphone, a tablet computer, or any suitable device. The voicemail client 120 and the applications 122 may be implemented using hardware, software, firmware, coding, or any other suitable logic to facilitate the functionality described herein. Although not pictured in FIG. 1 for the sake of clarity, the mobile device 102 may include other functionality, such as wireless communication functionality, etc. The mobile device 102 is configured to communicate with the voicemail system 104, the voicemail server 106, and/or the server 108, as well as suitable data networks (e.g., cellular networks, local area networks, etc.).

The voicemail client 120 may be software executed by the mobile device 102 to allow the mobile device 102 to interface with the voicemail server 106 and/or the voicemail system 104. In this manner, the mobile device 102 may obtain voicemail from the voicemail server 106 or the voicemail system 104.

The applications 122 may include smartphone applications, such as an electronic mail client, a calendar application, etc. In one example, the applications 122 may include an electronic mail client that interfaces to the server 108 via any suitable data network. As described in further detail below, the applications 122 may interact with the voicemail client 120 to determine whether the mobile device 102 should access the voicemail system 104 or the voicemail server 106 in response to a user indicating a desire to access voicemail. In one particular example, a user may indicate a desire to access voicemail by pressing and holding a key on the mobile device 102 or by controlling the mobile device 102 using any other suitable interface or menu system.

The voicemail system 104 of the example of FIG. 1 may be implemented using a traditional audible-only voicemail system having a user interface referred to as a telephone user interface (TUI). As such, the voicemail system 104 is typically accessed by the mobile device 102 through a telephone network, wherein the mobile device 102 calls a telephone number associated with the voicemail system 104 and logs into a user's voicemail account. In some examples, the mobile device 102 may be programmed so that a keypress, such as the press or press and hold of the "1" key, results in the mobile device 102 dialing the voicemail system 104.

The voicemail server 106 of the example of FIG. 1 may be implemented using a visual voicemail system that provides voicemail functionality to the mobile device 102 without the mobile device 102 having to call the voicemail server 106. Instead, the interface between the mobile device 102 and the voicemail server 106 may be a data connection whereby voicemail information may be provided from the voicemail server 106 to the voicemail client 120 of the mobile device 102 without the mobile device 102 having to place a telephone call to the voicemail server 106. In such a manner, voicemail may be delivered from the voicemail server 106 to the mobile device 102 without the user of the mobile device having the inconvenience of placing a call to the voicemail system 104.

The server 108 may be implemented using any suitable combination of hardware and software. For example, the server 108 may be implemented as an enterprise server. In one example, the server 108 includes policies 140 that may be used to govern the operation of the mobile device 102, which acts as a client to the server 108. For example, the policies 140 may govern whether the mobile device 102 is enabled to use visual voicemail. Other policies may exist.

The server 108 is further coupled to the telephone system 110. The telephone system 110 may be implemented using an enterprise telephone system, an Internet Protocol (IP)-based telephone system, a plain-old telephone system (POTS), etc. Accordingly, in accordance with some examples, a telephone line from the telephone system 110 may be associated with the mobile device 102 via the server 108. This association may provide functionality such as the ability for the mobile device 102 to host multiple telephone numbers (e.g., one telephone number from the network service provider and one telephone number from the telephone system 110). In such a manner, the mobile device 102 may be configured to ring when a telephone associated with the telephone system 110 is dialed. Accordingly, the usage of the telephone numbers associated with the mobile device 102 may be selected through a user interface on the mobile device 102.

Although shown as two separate blocks in the example of FIG. 1, the voicemail system 104 and the voicemail server 106 may be integrated into a single server, device, or collection of devices. In this manner, it is possible for a single hardware and software installation to provide both visual voicemail services and TUI voicemail services.

In general, during operation, a user of the mobile device 102 desires to retrieve his or her voicemail and indicates such by, for example, pressing and holding a key on the mobile device 102. In response to the keypress, the mobile device 102 determines whether visual voicemail is available and, if visual voicemail is available, shows the visual voicemail interface on the mobile device 102 which will be populated with information from the voicemail server 106. Alternatively, if the mobile device 102 determines that visual voicemail is unavailable, the mobile device 102 places a call to access the voicemail system 104. In this manner, the user is presented with his or her voicemail seamlessly by depressing a single key and receiving visual voicemail, if available, or TUI voicemail.

Figure 2:
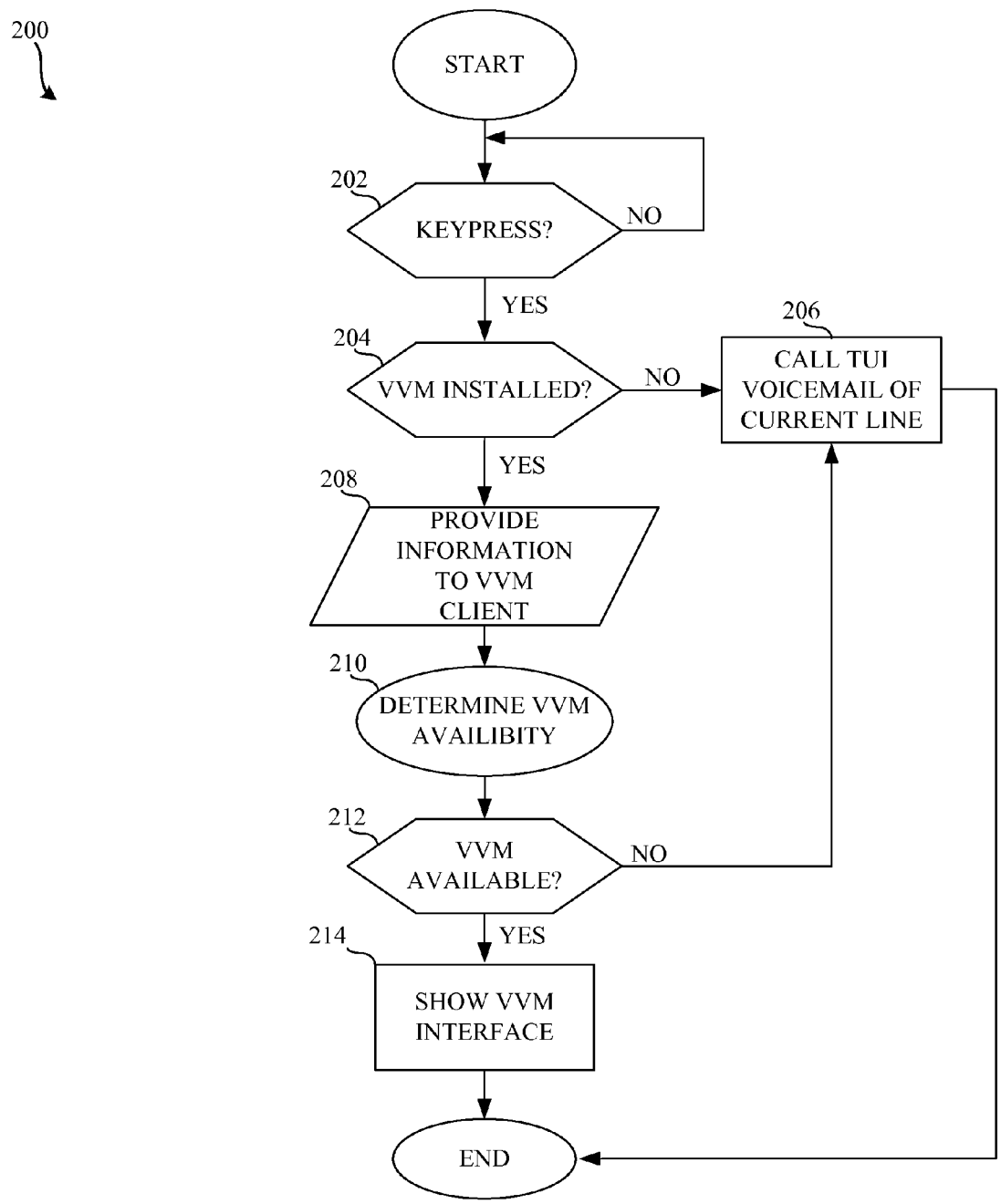
FIG. 2 depicts an example flow diagram representative of a process, which may be implemented using computer readable instructions on a mobile device that may be used to obtain voicemail messages in accordance with the system of FIG. 1.
Figure 3:
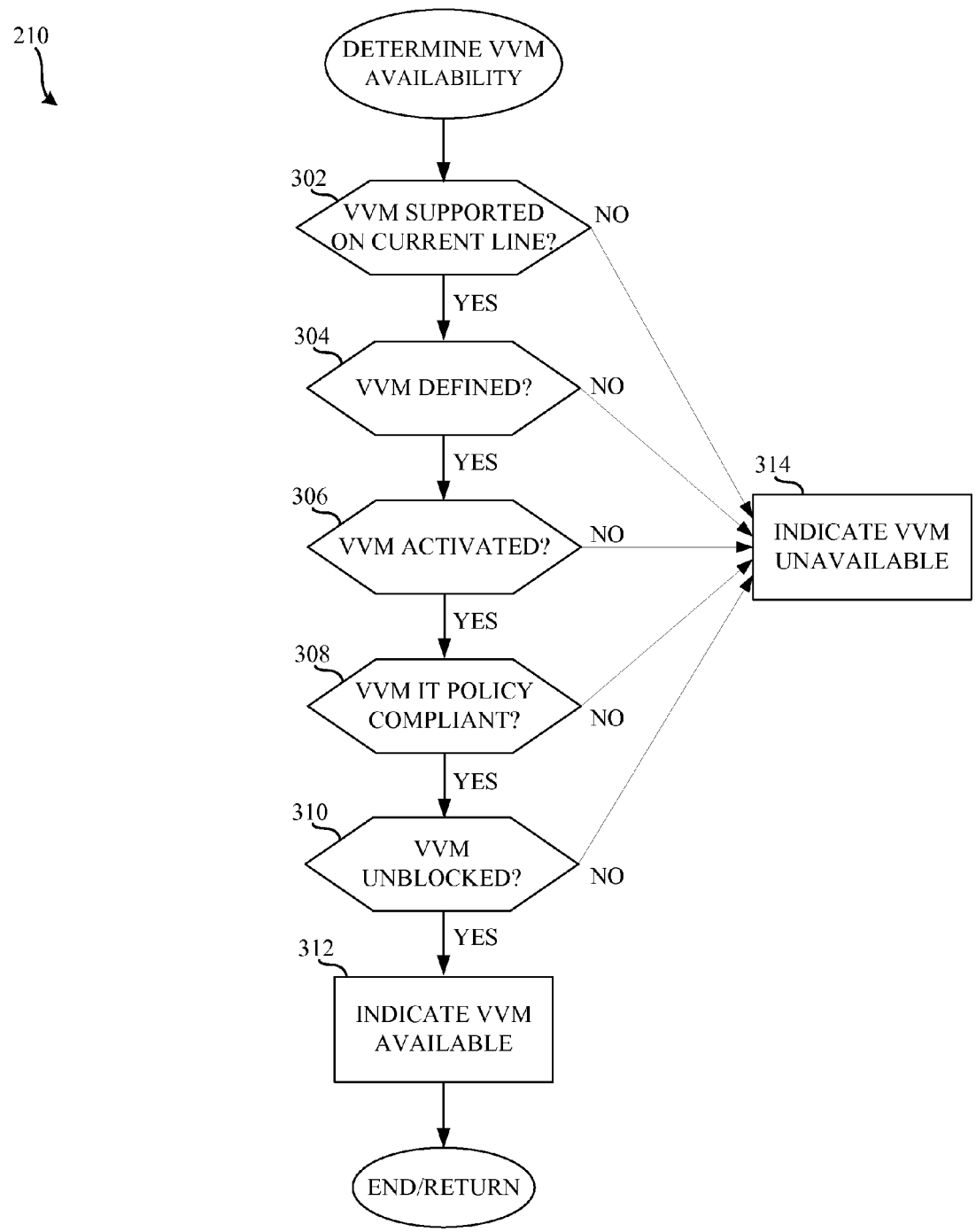
FIG. 3 depicts an example flow diagram representative of a process, which may be implemented using computer readable instructions on a mobile device that may be used to determine visual voicemail (VMM) availability in accordance with the system of FIG. 1 and the process of FIG. 2.

FIGS. 2 and 3 depict example flow diagrams representative of processes that may be implemented using, for example, computer-readable instructions stored on a computer-readable medium to obtain voice messages. The example processes of FIGS. 2 and 3 may be performed using one or more processors, controllers, and/or any other suitable processing devices. For example, the example processes of FIGS. 2 and 3 may be implemented using coded instructions (e.g., computer readable instructions) stored on one or more tangible computer readable media such as flash memory, read-only memory (ROM), and/or random-access memory (RAM), such as may be found in the mobile device 102 of FIG. 1.

As used herein, the term tangible computer readable medium is expressly defined to include any type of computer readable storage and to exclude propagating signals. Additionally or alternatively, the example processes of FIGS. 2 and 3 may be implemented using coded instructions (e.g., computer-readable instructions or machine-accessible instructions) stored on one or more non-transitory computer readable media such as flash memory, read-only memory (ROM), random-access memory (RAM), cache, or any other storage media in which information is stored for any duration (e.g., for extended time periods, permanently, brief instances, for temporarily buffering, and/or for caching of the information).

As used herein, the term non-transitory computer-readable medium and non-transitory machine-accessible medium are expressly defined to include any type of computer-readable medium or machine-accessible medium.

Alternatively, some or all operations of the example processes of FIGS. 2 and 3 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all operations of the example processes of FIGS. 2 and 3 may be implemented manually or as any combination(s) of any of the foregoing techniques, for example, any combination of firmware, software, discrete logic and/or hardware. Further, although the example processes of FIGS. 2 and 3 are described with reference to the flow diagrams of FIGS. 2 and 3, other methods of implementing the processes of FIGS. 2 and 3 may be employed. For example, the order of execution of the blocks may be changed, and/or some of the blocks described may be changed, eliminated, sub-divided, or combined. Additionally, any or all operations of the example processes of FIGS. 2 and 3 may be performed sequentially and/or in parallel by, for example, separate processing threads, processors, devices, discrete logic, circuits, etc.

In the illustrated example, the processes of FIGS. 2 and 3 are described below as performed by the mobile device 102 of FIG. 1. However, the example processes of FIGS. 2 and 3 may additionally or alternatively be implemented using any other suitable device or apparatus.

Now turning to FIG. 2, an example 200 is shown. The process of FIG. 2 may be implemented using, for example, computer-readable instructions, or any suitable combination of hardware and/or software and may be implemented on the mobile device 102 of FIG. 1. The mobile device 102 waits for a keypress or any other suitable indication that voicemail is to be presented to the user (block 202). In one example, a keypress manager of the mobile device 102 may monitor for a keypress and report that keypress to other applications, systems, or subsystems within the mobile device 102. Such applications determine that the keypress is intended to invoke voicemail when, for example, the keypress is a press and hold of the "1" key on the keypad of the mobile device 102.

When the keypress is detected (block 202), the mobile device 102 determines if the visual voicemail client 120 is installed on the mobile device 102 (block 204). This determination may be made by the process 200 determining whether files associated with the visual voicemail client 120 are in memory of the mobile device 102. If the visual voicemail client 120 is not installed on the mobile device 102 (block 204), the mobile device 102 calls the TUI voicemail of the current line (block 206). That is, with reference to FIG. 1 the mobile device 102 places a call to the voicemail system 104.

Alternatively, if the visual voicemail client 120 is installed on the mobile device 102 (block 204) information is provided to the voicemail client 120 (block 208). The information provided may include information regarding an identification of the current line being used by the mobile device 102 and the mobile subscriber international subscriber directory number (MS ISDN) of the subscriber identity module (SIM) of the mobile device 102.

The mobile device 102 then determines visual voicemail availability (block 210). This determination may be made by one or more of the applications 122 or may be made by the voicemail client 120. Further details regarding the determination of visual voicemail availability are provided below in conjunction with FIG. 3.

If visual voicemail is not available (block 212), the mobile device 102 calls the TUI voicemail of the current line (block 206). Alternatively, if visual voicemail is available (block 212), the mobile device 102 displays the visual voicemail interface (block 214). The visual voicemail interface facilitates user interaction with visual voicemail. Further detail regarding operations of visual voicemail is not provided herein for the sake of clarity. However, using the visual voicemail interface presented at block 214, a user may interact with visual voicemail in any suitable manner. In some embodiments, access to the voicemail server 106 may not be necessary when presenting the visual voicemail interface because the voicemail from the voicemail server 106 may have already been provided to the voicemail client 110.

Referring now to FIG. 3, additional detail regarding the process to determine visual voicemail availability block 210 of FIG. 2 includes a number of different tests and/or decisions; however, the operations shown in FIG. 3 provide merely one example of how visual voicemail availability may be determined. For example, more or fewer tests and/or decisions may be used to determine availability of visual voicemail. Accordingly, the detail provided in conjunction with FIG. 3 is merely one example.

The process 210 determines if visual voicemail is supported on the current line or a selected line (block 302). This determination may be made by the mobile device 102 by associating the MS ISDN and the mailbox or the username and the mailbox to determine if a VVM mailbox exists for the current line. If the process 210 determines that visual voicemail is supported on the current line (block 302), the process 210 determines whether visual voicemail is defined for the MS ISDN associated with the SIM of the mobile device 102 (block 304).

If visual voicemail is defined (block 304), the process 210 determines whether visual voicemail is activated (block 306). In one example, visual voicemail may be activated by a user configuring the settings for his/her voicemail account. When visual voicemail is configured, the settings for visual voicemail are stored. Thus, the process 210 may determine if visual voicemail is activated based on the presence or absence of settings stored on the mobile device 102.

The process 210 determines if visual voicemail is compliant with an information technology (IT) policy (block 308). In one example, the voicemail client 120, or any other suitable part of the mobile device 102, may query the policies 140 of the server 108 to determine whether visual voicemail is allowed under such policies 140. If visual voicemail is IT policy compliant (block 308), the process 210 determines whether visual voicemail has been blocked by any suitable server or service provider (block 310). For example, a wireless service provider (e.g., AT&T®, Verizon®, Sprint®, etc.) may block the usage of visual voicemail. Additionally, the server 108 may block the usage of visual voicemail outside of any blocking that may be carried out by the IT policies 140.

If visual voicemail has not been blocked (block 310), the process 210 indicates that visual voicemail is available (block 312). In one example, the voicemail server 106 may notify the voicemail client 120 that VMM is in the blocked state. In one example, the blocked state may be entered when a subscriber has not paid his/her bill. Alternatively, if any of the blocks 302, 304, 306, 308, 310 fail to indicate support, definition, activation, policy compliance, unblocking, the process 210 indicates that visual voicemail is unavailable (block 314).

Figure 4:
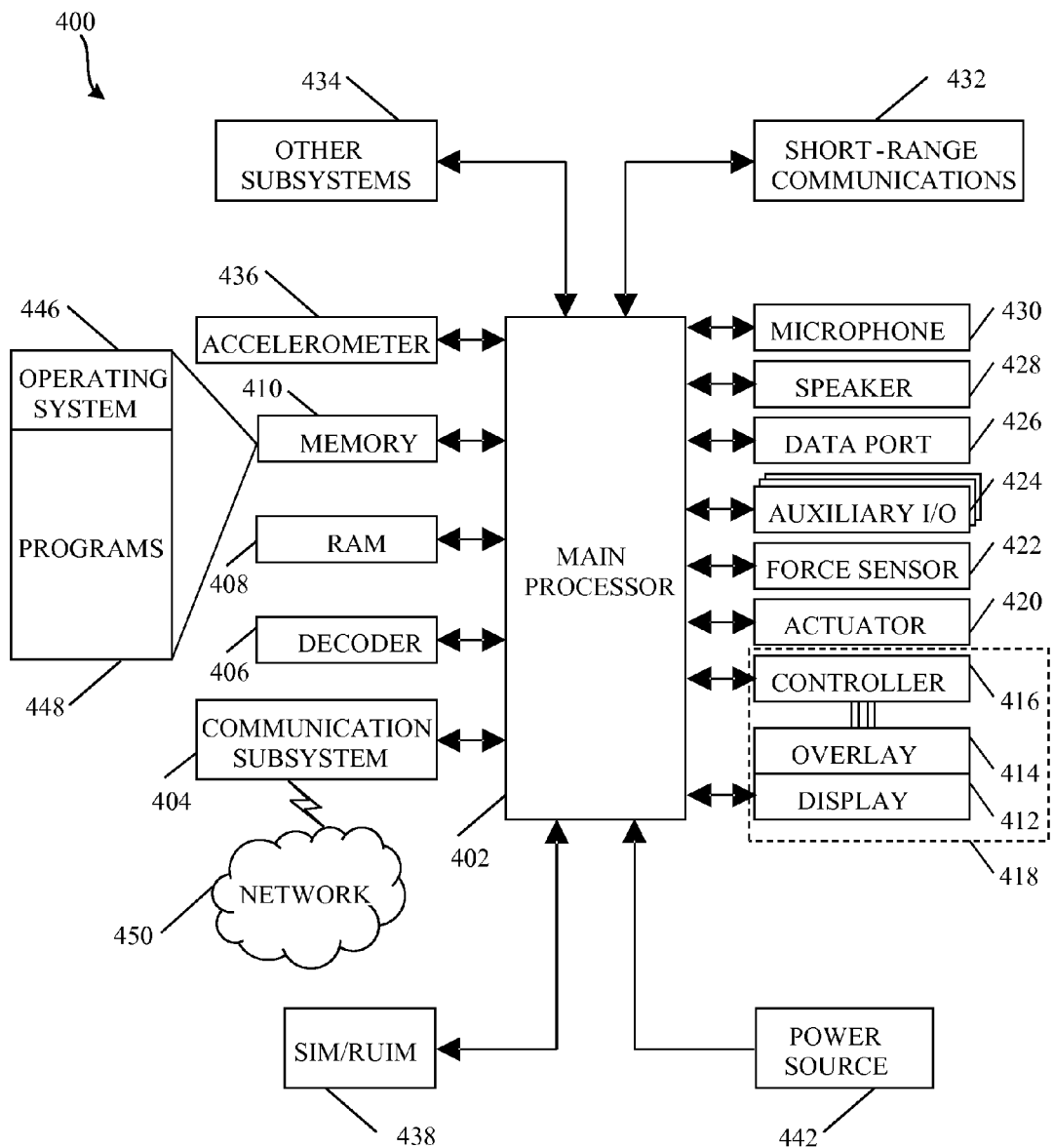
FIG. 4 is a block diagram of a mobile device in accordance with the disclosure.

Further detail of certain aspects of the mobile devices 102, 104 of FIG. 1 are shown in FIG. 4 with respect to a mobile, or portable electronic, device 400. The mobile device 400 includes multiple components, such as a processor 402 that controls the overall operation of the mobile device 400. Communication functions, including data and voice communications, are performed through a communication subsystem 404. Data received by the mobile device 400 is decompressed and decrypted by a decoder 406. The communication subsystem 404 receives messages from and sends messages to a wireless network 450. The wireless network 450 may be any type of wireless network, including, but not limited to, data wireless networks, voice wireless networks, and networks that support both voice and data communications. A power source 442, such as one or more rechargeable batteries or a port to an external power supply, powers the mobile device 400.

The processor 402 interacts with other components, such as Random Access Memory (RAM) 408, memory 410, a display 412 with a touch-sensitive overlay 414 operably coupled to an electronic controller 416 that together comprise a touch-sensitive display 418, one or more actuators 420, one or more force sensors 422, an auxiliary input/output (I/O) subsystem 424, a data port 426, a speaker 428, a microphone 430, short-range communications 432, and other device subsystems 434. In one example, the processor 402 and the memory 410 may cooperate to implement the functionality described in conjunction with FIGS. 2 and 3. For example, tangible and/or non-transitory, and/or machine readable instructions may be stored by the processor 402 and/or the memory 410 to implement the functionality shown in FIGS. 2 and 3.

Input via a graphical user interface is provided via the touch-sensitive overlay 414. The processor 402 interacts with the touch-sensitive overlay 414 via the electronic controller 416. Information, such as text, characters, symbols, images, icons, and other items that may be displayed or rendered on a mobile device, is displayed on the touch-sensitive display 418 via the processor 402. The processor 402 may interact with an accelerometer 436 that may be utilized to detect direction of gravitational forces or gravity-induced reaction forces.

To identify a subscriber for network access, the mobile device 400 may utilize a Subscriber Identity Module or a Removable User Identity Module (SIM/RUIM) card 438 for communication with a network, such as the wireless network 450. Alternatively, user identification information may be programmed into memory 410.

The mobile device 400 includes an operating system 446 and software programs, applications, or components 448 that are executed by the processor 402 and are typically stored in a persistent, updatable store such as the memory 410. Additional applications or programs may be loaded onto the mobile device 400 through the wireless network 450, the auxiliary I/O subsystem 424, the data port 426, the short-range communications subsystem 432, or any other suitable subsystem 434.

A received signal such as a text message, an e-mail message, or web page download is processed by the communication subsystem 404 and input to the processor 402. The processor 402 processes the received signal for output to the display 412 and/or to the auxiliary I/O subsystem 424. A subscriber may generate data items, for example e-mail messages, which may be transmitted over the wireless network 450 through the communication subsystem 404. For voice communications, the overall operation of the mobile device 400 is similar. The speaker 428 outputs audible information converted from electrical signals, and the microphone 430 converts audible information into electrical signals for processing.

As described above example methods, apparatus, and articles of manufacture facilitate operations in a mobile device to obtain voice messages. In one example, a method includes receiving at a mobile device an indication to access voicemail, determining if visual voicemail is available, and initiating a call to a voicemail system in response to determining that visual voicemail is unavailable. In such a manner, a user may press a single key of a mobile device and be presented with either the visual voicemail client, if such functionality is available, or the mobile device may access a voicemail server if visual voicemail is not available. Thus, the user interface is simplified in that a single key on the mobile device may be used to access one or more sources of voicemail. This configuration eliminates the need for the user of the mobile device to decide which voicemail services are or are not available and, instead, rely on a single keypress to access voicemail services in the best way possible.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method implemented by a mobile device, comprising:
   receiving at the mobile device an indication to access voicemail;
   determining if a visual voicemail client is installed on the mobile device;
   if the visual voicemail client is not installed, calling an audible-only telephone user interface (TUI) voicemail of a current line of a voicemail system; and
   if the visual voicemail client is installed:
   determining if visual voicemail is available prior to attempting to communicate with the voicemail system; and
   initiating a call to the voicemail system in response to determining that visual voicemail is unavailable, wherein initiating a call comprises automatically initiating a call to access a telephone user interface for voicemail in response to determining that visual voicemail is unavailable.

2. The method of claim 1, wherein the indication comprises a keypress.

3. The method of claim 1, wherein determining if visual voicemail is available comprises determining if visual voicemail is supported on the current line selected on the mobile device.

4. The method of claim 1, wherein determining if visual voicemail is available comprises determining if visual voicemail is defined on the mobile device.

5. The method of claim 4, wherein determining if visual voicemail is defined is based on the MS ISDN of the mobile device.

6. The method of claim 1, wherein determining if visual voicemail is available comprises determining if visual voicemail is activated on the mobile device.

7. The method of claim 1, further comprising determining if visual voicemail is available comprises determining compliance with a policy on a server associated with the mobile device.

8. The method of claim 1, wherein determining if visual voicemail is available comprises determining if visual voicemail is blocked on the mobile device.

9. The method claimed in claim 1, wherein receiving at the mobile device an indication to access voicemail comprises receiving a user input associated with a request to access voicemail.

10. The method claimed in claim 9, wherein the user input comprises a keypress associated with telephone user interface access to voicemail.

11. A mobile device comprising:
    a housing;
    a display carried by the housing;
    a wireless receiver and transmitter carried by the housing; and
    a processor carried by the housing, coupled to the wireless receiver and transmitter, and coupled to the display, the processor configured to:
    receive at the mobile device an indication to access voicemail;
    determine if a visual voicemail client is installed on the mobile device;
    if the visual voicemail client is not installed, call an audible-only telephone user interface (TUI) voicemail of a current line of a voicemail system; and
    if the visual voicemail client is installed:

determine if visual voicemail is available prior to attempting to communicate with a voicemail system; and initiate a call to the voicemail system in response to determining that visual voicemail is unavailable, wherein initiating a call comprises automatically initiating a call to access a telephone user interface for voicemail in response to determining that visual voicemail is unavailable.

12. The mobile device of claim 11, wherein the indication comprises a keypress.

13. The mobile device of claim 11, wherein determining if visual voicemail is available comprises determining if visual voicemail is supported on the current line selected on the mobile device.

14. The mobile device of claim 11, wherein determining if visual voicemail is available comprises determining if visual voicemail is defined on the mobile device.

15. The mobile device of claim 14, wherein determining if visual voicemail is defined is based on the MS ISDN of the mobile device.

16. The mobile device of claim 11, wherein determining if visual voicemail is available comprises determining if visual voicemail is activated on the mobile device.

17. The mobile device of claim 11, further comprising determining if visual voicemail is available comprises determining compliance with a policy on a server associated with the mobile device.

18. The mobile device of claim 11, wherein determining if visual voicemail is available comprises determining if visual voicemail is blocked on the mobile device.

* * * * *